(No Model.)
H. CHANCE.
RAILWAY FROG.
No. 355,507. Patented Jan. 4, 1887.
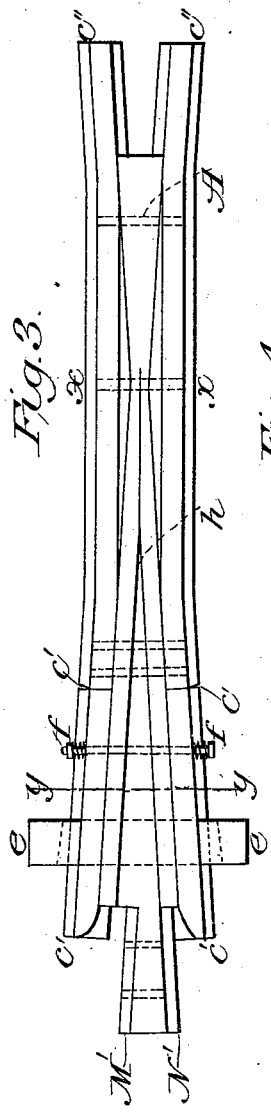
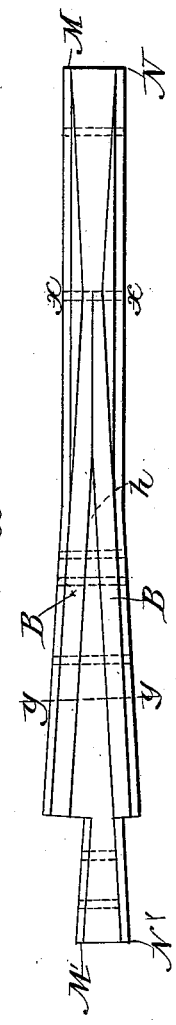
WITNESSES:
Henry Chance, INVENTOR
BY Charles G. Barnd,
his ATTORNEY

UNITED STATES PATENT OFFICE.

HENRY CHANCE, OF FOSTORIA, OHIO.

RAILWAY-FROG.

SPECIFICATION forming part of Letters Patent No. 355,507, dated January 4, 1887.

Application filed April 19, 1886. Serial No. 199,359. (No model.)

*To all whom it may concern:*

Be it known that I, HENRY CHANCE, a citizen of the United States, residing at Fostoria, in the county of Seneca and State of Ohio, have invented certain new and useful Improvements in Railway-Frogs; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to make a railway-frog that shall be strong, compact, readily repaired in its wearing parts without the removal or change of the whole frog, and that will be free from holes, slots, or places in which the foot may become fastened, and which may be used either with or without a guard-rail; and the invention consists in the certain features of construction, arrangement, and combination of parts, as hereinafter described and claimed.

Figure 1 shows a plan view of the device without the rails. Fig. 2 is a side view of Fig. 1. Fig. 3 is a plan view of the entire device. Fig. 4 is a side view of Fig. 3. Fig. 5 is a sectional view of Fig. 3 cut on the line $x$ at the throat or narrowest part of the frog to show the form and relative size of the wheel, passage-way, groove, and the manner of joining the central portion of the device with the side or supporting rails. Fig. 6 shows Fig. 3 cut on the line $y$ to show the grooves and manner of joining the side rails with the central part of the device. Fig. 7 shows the plan and side views of the guard and rest for the swinging ends of the wing-rails.

Fig. 1 is the principal part of the device, and is made of one single piece, preferably steel, shaped so as to fit at its sides into the hollow parts of the supporting-rails, and widening from a point near the center and throat of the frog lengthwise along the line of the rails, so as to fill the space between the rails, and to form, with the supporting-rails, a complete frog, as shown in Fig. 3.

Fig. 1 is grooved on the upper side on the end M N with a single flaring groove, A, which has its sides curved and downwardly and inwardly inclined, as shown in Fig. 5. This groove may be made about one and three-quarter inch wide across the top and about one and one-quarter inch deep on the line $y$. Although these proportions and depths and widths may be changed somewhat at the point $y$ and allowed to gradually widen until about four inches across the top at M N, I find in practice that this shape and size affords ample room for the passage of the wheel-flanges, while restricting the motion of the wheels to forward and backward motion, and does not allow the wearing lateral or swaying motion incident to greater play. This form of the groove brings the sides thereof in constant contact with and guides the flanges of the wheel firmly on the line of travel desired without the assistance of a guard-rail on the side of the track opposite the frog. At the throat of the frog on the line $x$ the groove A divides and is separated by a low point or tongue rising gradually out of the center of the bottom of the groove and widening, conforming on either side to the downward-curved shape of the groove, and forming the inner sides of the grooves B and B'. The tongue or point $h$ I bring far up into the throat and depress it low, raising it gradually from the bottom, so as to take hold of the flange of the wheel when passing from the single into the converging groove, and returning therefrom as soon as it leaves the support of the sides of the groove, along which it has been passing without obstructing the onward motion or travel of the wheel. I also make the grooves in this form, so as to avoid all openings in which the foot of a man or child could be fastened. I further provide against the danger of fastening the foot by extending the parts M N and M' N' to a point between the rails, at which it will be impossible to fasten the foot at either end of the frog. I have thus provided against the danger of fastening the foot in the frog at all places except the wedge-like openings usually formed between the central part and the wing-like ends of the supporting or side rails of the frog. These openings I close up by cutting the side or supporting rails at or near the line $c$ $c'$, and joining the cut ends thereof with any appropriate hinge, $d$ $d$, fastened by appropriate bolts of any form that will be secure, and may be easily detached to permit the removal of the wing-rails C' C' and C" C" for repair. I give the wing-rails a slight outward motion on the pivot of the hinges $d\ d$ when pressed by the flange of the passing wheel; but I confine this motion by the permanent flanges E E of the chair-guard. (Shown in Fig. 7.) I draw these hinged rails C' C' snugly against the central part of the frog by a spring or springs, $f\ f$, secured to the frog by a bolt and nut, which pass through the hinged ends and the entire body of the frog, as is shown in Fig. 3.

When closed, the frog presents no openings except the curved side grooves, and the top and sides of the rails, which join closely onto the grooves and afford no wedge-like openings or traps. The wing-rails are at the point of the greatest wear on a frog in actual use, and this method of making the supporting-rails each in two easily-removable parts renders it easy and inexpensive to replace only the part actually needing repair without disturbing the rest of the device.

The entire central portion of the device, as shown, between the letters M N and M' N', Fig. 1, forms a firm support for the bulk of the weight of the passing train in traveling from one line of track to another, as well as a guide to the direction thereof.

Having thus described my invention, what I claim, and wish to secure by Letters Patent, is—

1. A railway-frog having the winged or flaring ends of the side or supporting rails, C' C' and C" C", cut and hinged near the point of greatest wear, so as to be easily removable and drawn together and confined within a limited space, substantially as, for the purposes, and in the manner set forth.

2. In combination with the supporting-rails, a single piece of steel which fits into their sides and constitutes the principal part of the frog, said piece being formed with a groove, A, which is divided into two grooves, B, by a raised tapering tongue or point, $h$, substantially as set forth.

3. A railway-frog having downward-curved sided passage-grooves for the wheel-flanges, spring wing-bars which close up all wedge-like openings in which the foot may be fastened, and which is so constructed as to remove all places or openings in which the foot may become fastened.

In testimony whereof I hereunto affix my signature in the presence of two witnesses.

HENRY CHANCE.

Witnesses:
   JACOB M. SCHATZEL,
   J. P. SCHATZEL.